(12) United States Patent
Thaker et al.

(10) Patent No.: US 9,380,103 B2
(45) Date of Patent: Jun. 28, 2016

(54) ADAPTING LEGACY ENDPOINTS TO MODERN APIS

(71) Applicant: eBay, Inc., San Jose, CA (US)

(72) Inventors: Nikhil Vijay Thaker, Round Rock, TX (US); Kamal Zamer, Austin, TX (US)

(73) Assignee: eBay Inc., San Jose, CA (US)

( * ) Notice: Subject to any disclaimer, the term of this patent is extended or adjusted under 35 U.S.C. 154(b) by 94 days.

(21) Appl. No.: 14/091,713

(22) Filed: Nov. 27, 2013

(65) Prior Publication Data

US 2015/0006318 A1    Jan. 1, 2015

Related U.S. Application Data

(60) Provisional application No. 61/840,192, filed on Jun. 27, 2013.

(51) Int. Cl.
*G06F 13/00* (2006.01)
*H04L 29/08* (2006.01)
*G06Q 30/06* (2012.01)

(52) U.S. Cl.
CPC ............ *H04L 67/00* (2013.01); *G06Q 30/0633* (2013.01); *H04L 67/02* (2013.01)

(58) Field of Classification Search
CPC ................................ G06F 9/541; G06F 9/547
USPC ................................................. 719/328, 330
See application file for complete search history.

(56) References Cited

U.S. PATENT DOCUMENTS 9,049,182 B2 *   6/2015  Burch et al. ............ H04L 63/08
2013/0046894 A1 *   2/2013  Said et al. ............... G06F 9/547
                                                   709/226

OTHER PUBLICATIONS

"Information Technology—Open Systems Interconnection—Basic Reference Model: The Basic Model", ITU-T Recommendation X.200, (Jul. 1994), 63 pgs.
Braithwaite, Bradley, "Replacing the Service Layer with an HTTP API", [Online]. Retrieved from the Internet: <URL: http://www.contentedcoder.com/2013/02/replacing-service-layer-with-http-api.html>, (Feb. 2013), 4 pgs.
Guarnacci, Nino, "Oracle Coherence & Oracle Service Bus: REST API Integration", [Online]. Retrieved from the Internet: <URL: https://blogs.oracle.com/slc/entry/oracle_coherence_and_service_bus>, (Nov. 17, 2011), 17 pgs.
(Continued)

*Primary Examiner* — Andy Ho
(74) *Attorney, Agent, or Firm* — Schwegman, Lundberg & Woessner, P.A.

(57) ABSTRACT

Example methods and systems are directed to adapting legacy endpoints to modern application protocol interfaces (APIs). A legacy endpoint may provide a powerful and complex API. A modern application may desire access to the legacy endpoint. One or more layers may be added between the modern application and the legacy endpoint. Each layer may provide a different API. These layers of APIs may transform the interface from a powerful and complex interface to a more limited but simpler and easier to use interface. In some example embodiments, a proxy layer, an adapter layer, a facade layer, and a service layer may be used.

15 Claims, 7 Drawing Sheets

(56) References Cited

OTHER PUBLICATIONS

Perrochon, Louis, "Multiple Service Integration Confronted with Legacy Systems", Contribution to the Workshop "Offering the same information via multiple services" of the First International Conference on the World-Wide Web, Geneva,, [Online]. Retrieved from the Internet: <URL: ftp://ftp.inf.ethz.ch/doc/papers/is/ea/www94.html>, (May 1994), 8 pgs.

Richards, Mark, "Transaction strategies: The API Layer strategy", [Online]. Retrieved from the Internet: <URL: http://www.ibm.com/developerworks/library/j-ts3/j-ts3-pdf.pdf>, (Apr. 14, 2009), 1-12.

\* cited by examiner

ADAPTING LEGACY ENDPOINTS TO MODERN APIS

CROSS-REFERENCE TO RELATED APPLICATIONS

This application claims the benefit of U.S. Provisional Application No. 61/840,192, filed Jun. 27, 2013, entitled "ADAPTING LEGACY ENDPOINTS TO MODERN APIS," which is incorporated herein by reference in its entirety.

TECHNICAL FIELD

The subject matter disclosed herein generally relates to application protocol interfaces (APIs). Specifically, in one example embodiment, the present disclosure addresses adapting legacy endpoints to modern APIs.

BACKGROUND

A legacy endpoint may present a complex API that accepts many parameters or provides a large volume of data. For example, while modern programming practice may recommend providing a large number of functions, each of which takes a few parameters, to accomplish a set of tasks, a legacy endpoint may provide fewer functions with more parameters to perform the same set of tasks.

A representational state transfer (REST) architecture may support a RESTful interface between a client and a server. The RESTful interface may be stateless (e.g., no client context may be stored on the server between requests). The RESTful interface may be cacheable (e.g., responses from the server may indicate if they are cacheable). A client may cache the cacheable responses, reducing network traffic and latency. The RESTful interface may be layered (e.g., the client may connect to an intermediate server rather than an end server). The RESTful interface may identify the resources involved in each request in order to allow the client to modify the resources it possesses. Furthermore, in a stateless RESTful interface, each REST message may be self-contained and include enough information to describe how to process the message. Some clients may track their own state and make state transitions only through hypermedia (e.g., hyperlinks).

BRIEF DESCRIPTION OF THE DRAWINGS

Some embodiments are illustrated by way of example and not limitation in the figures of the accompanying drawings.

DETAILED DESCRIPTION

Example methods and systems are directed to adapting legacy endpoints to modern APIs. Examples merely typify possible variations. Unless explicitly stated otherwise, components and functions are optional and may be combined or subdivided, and operations may vary in sequence or be combined or subdivided. The term "function" is used generally to encompass functions, methods, calls, data requests, and operations. In the following description, for purposes of explanation, numerous specific details are set forth to provide a thorough understanding of example embodiments. It will be evident to one skilled in the art, however, that the present subject matter may be practiced without these specific details.

A legacy endpoint (e.g., a machine, a service, an application, a library, or any suitable combination thereof) may provide a powerful and complex API. A legacy endpoint may be an existing code base that provides functionality. A modern application may desire access to the legacy endpoint. The modern application may be a new application developed after the legacy endpoint.

In example embodiments, one or more layers may be added between the modern application and the legacy endpoint. Each layer may provide a different API. These layers of APIs may transform the interface of the legacy endpoint from a powerful and complex interface to a more limited, but simpler and easier to use interface. For example, a proxy layer may communicate with the legacy endpoint and provide full functionality of the legacy endpoint, using a different API. An adapter layer may communicate with the proxy layer and allow the user of the adapter layer to choose between synchronous and asynchronous execution of requests. A facade layer may communicate with the adapter layer and provide a variety of facades to the user, depending on the specific subset of desired functionality. A facade layer provides a simpler interface to a larger body of code. For example, a function in the adapter layer may take two parameters and the corresponding function in the facade layer may take only one parameter. The facade layer function may call the adapter layer function, passing on the one received parameter and supplying a second fixed parameter. Alternatively, the second parameter may be based on the first parameter, or both the first and second parameter passed to the adapter layer function may be generated based on the single parameter received by the facade layer.

A service layer may communicate with the facade layer and automatically populate some of the fields used by the facade layer for the user. In some example embodiments, the user of the service layer then needs only to understand the modern API provided by the service layer to take advantage of the power provided by the legacy endpoint.

Each layer may insulate each successive layer from changes. For example, if the proxy layer changes, the adapter layer may change accordingly, but the facade layer and service layer may be insulated from the change by the adapter layer. In some example embodiments, this insulation reduces updates that need to occur if implementation details in one of the layers changes.

Figure 1:
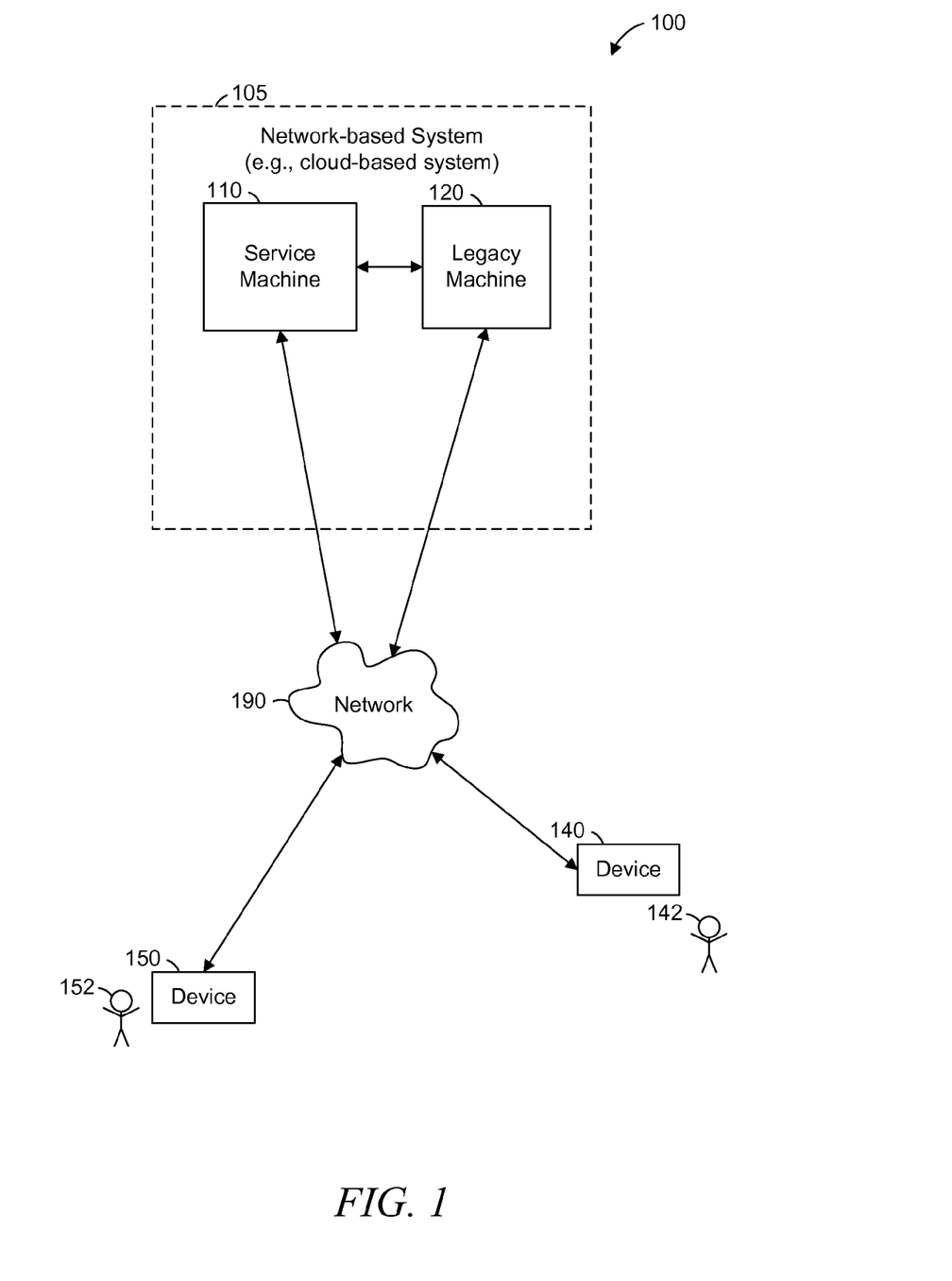
FIG. 1 is a block diagram illustrating an example of a network environment for adapting legacy endpoints to modern APIs, according to example embodiments.

FIG. 1 is a block diagram illustrating an example of a network environment 100 for adapting legacy endpoints to modern APIs, according to particular example embodiments. The network environment 100 includes a service machine 110, a legacy machine 120 (the service machine 110 and the legacy machine 120 together comprising a network-based system 105), a device 140 and a device 150, all communicatively coupled to each other via a network 190. The network-based system 105 may be a cloud-based system. The service machine 110, the legacy machine 120, and the devices 140, 150, may each be implemented in a computer system, in whole or in part, as described below with respect to FIG. 7.

The devices 140 and 150 may access services provided by the service machine 110. The service machine 110 may be the point of contact for the devices 140, 150 with the network-based system 105. Alternatively or additionally, the devices 140, 150 may communicate directly with the legacy machine 120 as well as (or instead of) the service machine 110.

One or both of users 142 and 152 may be a human user, a machine user (e.g., a computer configured by a software program to interact with one or more of the devices 140, 150), or any suitable combination thereof (e.g., a human assisted by a machine or a machine supervised by a human). The user 142 is not necessarily part of the network environment 100, but is instead primarily associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not necessarily part of the network environment 100, but is instead primarily associated with the device 150. As an example, the device 150 may be a desktop computer, a vehicle computer, a tablet computer, a navigational device, a portable media device, or a smart phone belonging to the user 152.

Any of the machines or devices shown in FIG. 1 may be implemented in a general-purpose computer modified (e.g., configured or programmed) by software to be a special-purpose computer to perform the functions described herein for that machine or device. For example, a computer system able to implement any one or more of the methodologies described herein is discussed below with respect to FIG. 7. Any two or more of the machines or devices illustrated in FIG. 1 may be combined into a single machine, and the functions described herein for any single machine or device may be subdivided among multiple machines or devices.

The network 190 may be any network that enables communication between or among machines and devices (e.g., the service machine 110 and the device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
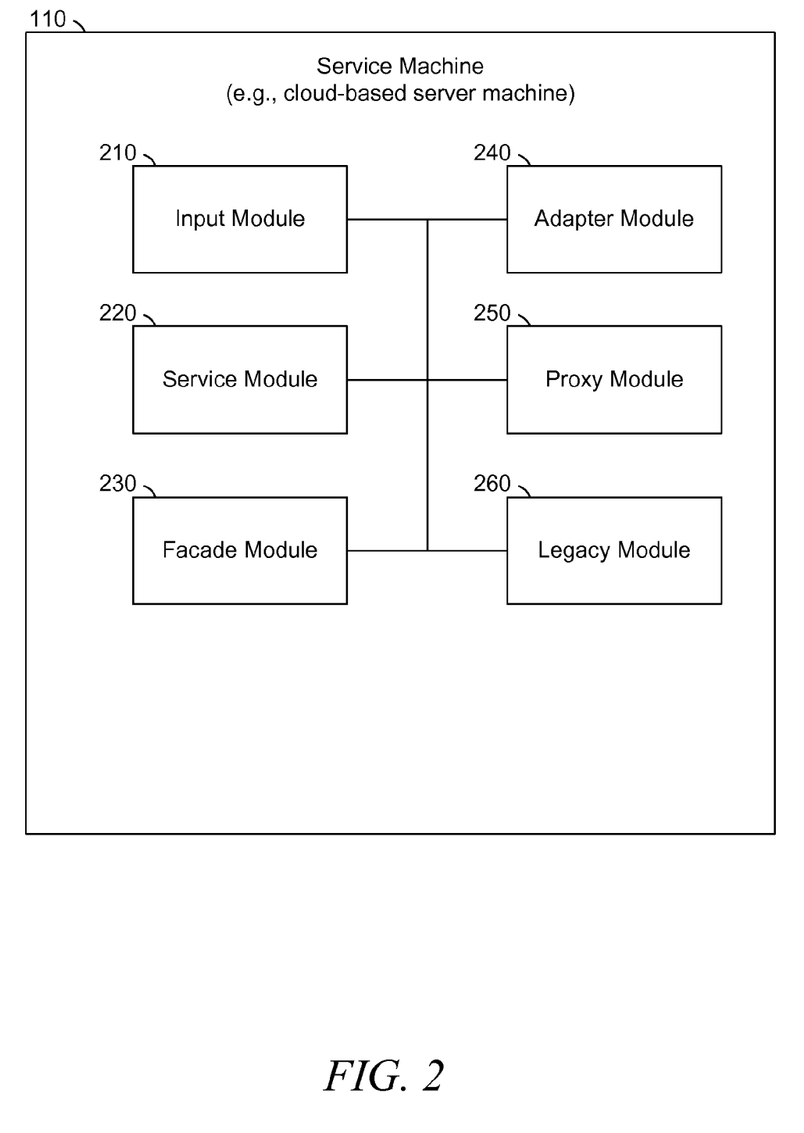
FIG. 2 is a block diagram illustrating components of a service machine for adapting legacy endpoints to modern APIs, according to example embodiments.

FIG. 2 is a block diagram illustrating components of the service machine 110 for adapting legacy endpoints to modern APIs, according to example embodiments. The service machine 110 is shown as including an input module 210, a service module 220, a facade module 230, an adapter module 240, a proxy module 250, and a legacy module 260, all configured to communicate with each other (e.g., via a bus, shared memory, a switch, or any other suitable inter-module communication mechanism). The service machine 110 may be a cloud-based server machine, accessible via the cloud (e.g., via TCP/IP (transmission control protocol/Internet protocol) or other Internet protocols). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine or device may be distributed across multiple machines, or devices.

The input module 210 may be configured to receive a data stream. For example, the input module 210 may receive user inputs for a business process and generate function calls to the service module 220 using a modern API.

The service module 220 may accept the function calls and invoke an appropriate facade in the facade module 230 for processing. Invoking the facade may include identifying a source of the request and sending additional information to the facade based on the source. The service module 220 may be a REST service module. The service module 220 may be configured to provide an API and receive hypertext transport protocol (HTTP) calls conforming to the API. Based on the received HTTP calls, the service module 220 may determine correct methods in the facade module 230 to call to generate desired results. After identifying the correct methods in the facade module 230, the service module 220 may call those methods and receive a result in response. Based on the result (e.g., by modifying the result), the service module 220 may respond to the HTTP calls with the desired results.

The facade module 230 may invoke an appropriate adapter function in the adapter module 240 for processing. Invoking the adapter function may include determining whether the adapter function should be handled synchronously or asynchronously and including an indication of the synchronous/asynchronous choice. For example, the facade module 230 may be configured to receive function calls from the service module 220, and determine the correct functions in the adapter module 240 to call to provide the results desired by the service module 220 based on the function calls received from the service module 220. The facade module 230 may then call the correct functions in the adapter module 240. After receiving the results from the adapter module 240, the facade module 230 may modify the results to conform to a format desired by the service module 220 (e.g., a REST service module format) and provide the modified results to the service module 220 in response to the function calls received from the service module 220.

The adapter module 240 may invoke an appropriate proxy function in the proxy module 250 for processing. Invoking the proxy function may include identifying a context of the request and sending additional information to the proxy function based on the context. For example, the adapter module 240 may be configured to receive function calls from the facade module 230, and determine the correct functions in the proxy module 250 to call in order to provide the results desired by the facade module 230 based on the function calls received from the facade module 230. To illustrate, the sequence and parameters of previously received calls may be the context of the current call, and based on the sequence and parameters of previously received calls, the desired call to the proxy function may be identified and appropriate parameters to the identified call may be generated and sent. The adapter module 240 may then call the correct functions in the proxy module 250 with the correct parameters, receive desired results from the proxy module 250, and provide the desired results to the facade module 230 in response to the function calls received from the facade module 230.

The proxy module 250 may invoke an appropriate legacy function in the legacy module 260 for processing. The legacy module 260 may be accessed using a legacy API and may respond to the proxy module 250 with the requested data. The proxy module 250 may process, parse, or reformat the requested data before responding to the adapter module 240 with the requested data. In some example embodiments, the proxy module 250 exposes only functions provided by the legacy module 260 and does not expose any other functions. Likewise, the adapter module 240 may add, remove, or transform data from the requested data to conform with the specific request from the facade module 230 before responding with the requested data. The facade module 230 may also add, remove, or transform data from the requested data to conform with the specific request from the service module 220. The service module 220 may also add, remove, or transform data from the requested data to conform with the specific request from the input module 210.

Each of the modules 210-250 may generate more or fewer function calls to the next module 220-260 than it receives. For example, a single function call to the service module 220 may generate several function calls to the facade module 230. As another example, several sequential calls to the service module 220 may only generate a single function call to the facade module 230. To support this, data regarding previous function calls may be stored by the service module 220 during processing of a first function call and accessed by the service module 220 during processing of a second function call to determine that the complete set of information required to make a corresponding function call to the facade module 230 has been received. In this case, the second function call is a supplemental function call that supplements the information provided by the first function call. For example, if the facade module 230 provides a function setNameAndAddress that requires two parameters: a name and an address, and the service module 220 provides two functions, setName and setAddress, each of which takes the corresponding single parameter, an initial call to one of setName or setAddress may cause the service module 220 to store the corresponding parameter and a supplemental call to the other of setName or setAddress may cause the service module 220 to retrieve the previously-stored parameter and make a call to setNameAndAddress with the two provided parameters.

The above example can be extended to arbitrary numbers of provided parameters in arbitrary combinations. For example, three parameters may be provided in a first function call, two parameters provided in a second function call (i.e., a first supplemental function call), and four parameters provided in a third function call (i.e., a second supplemental function call). In an embodiment, no functions are called in the next layer until all three function calls are received, and at that time, a plurality of functions, each taking different combinations of initial and supplemental parameters are called.

Figure 3:
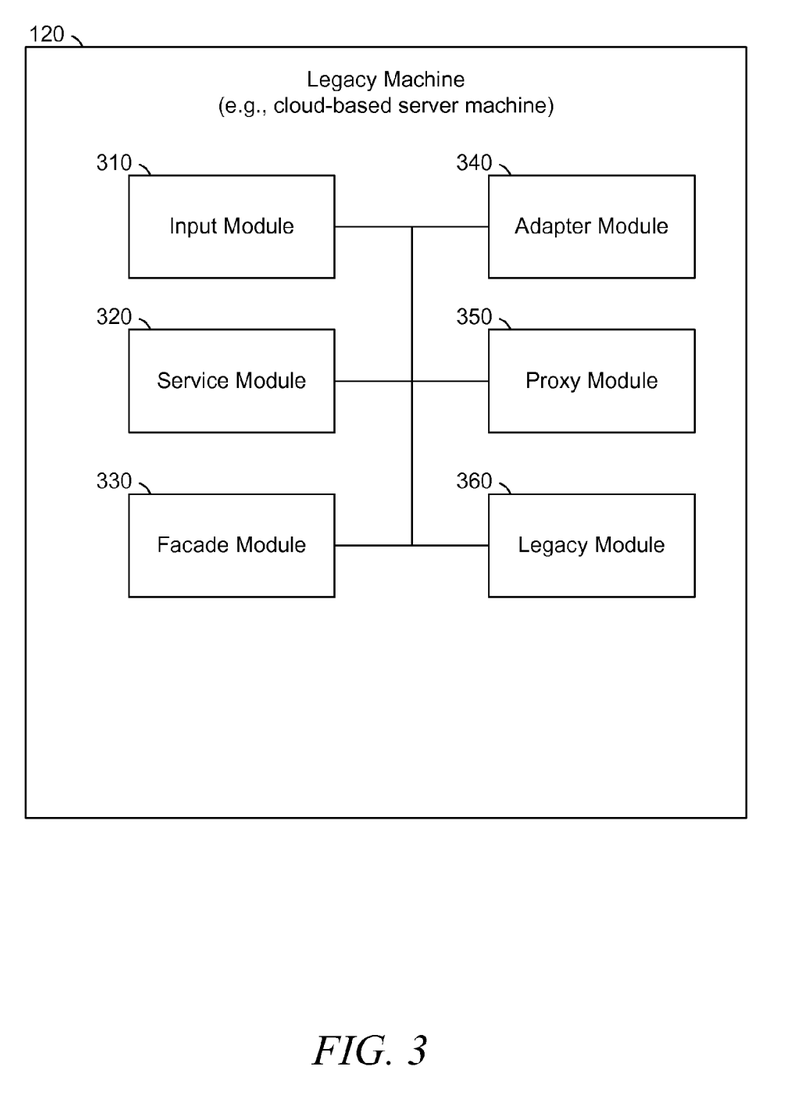
FIG. 3 is a block diagram illustrating components of a legacy machine for adapting legacy endpoints to modern APIs, according to example embodiments.

FIG. 3 is a block diagram illustrating components of the legacy machine 120 for adapting legacy endpoints to modern APIs, according to example embodiments. The legacy machine 120 is shown as including an input module 310, a service module 320, a facade module 330, an adapter module 340, a proxy module 350, and a legacy module 360, all configured to communicate with each other (e.g., via a bus, shared memory, or a switch). The modules 310-360 have the same operations as the similarly-named modules 210-260, described above with respect to FIG. 2. The legacy machine 120 may be a cloud-based server machine, accessible via the cloud (e.g., via TCP/IP or other Internet protocols). In some example embodiments, the service machine 110 does not include the legacy module 260, and the legacy machine 120 does not include the service module 320, the facade module 330, the adapter module 340, or the proxy module 350. In such example embodiments, the proxy module 250 and the legacy module 360 may communicate via a network connection.

Figure 4:
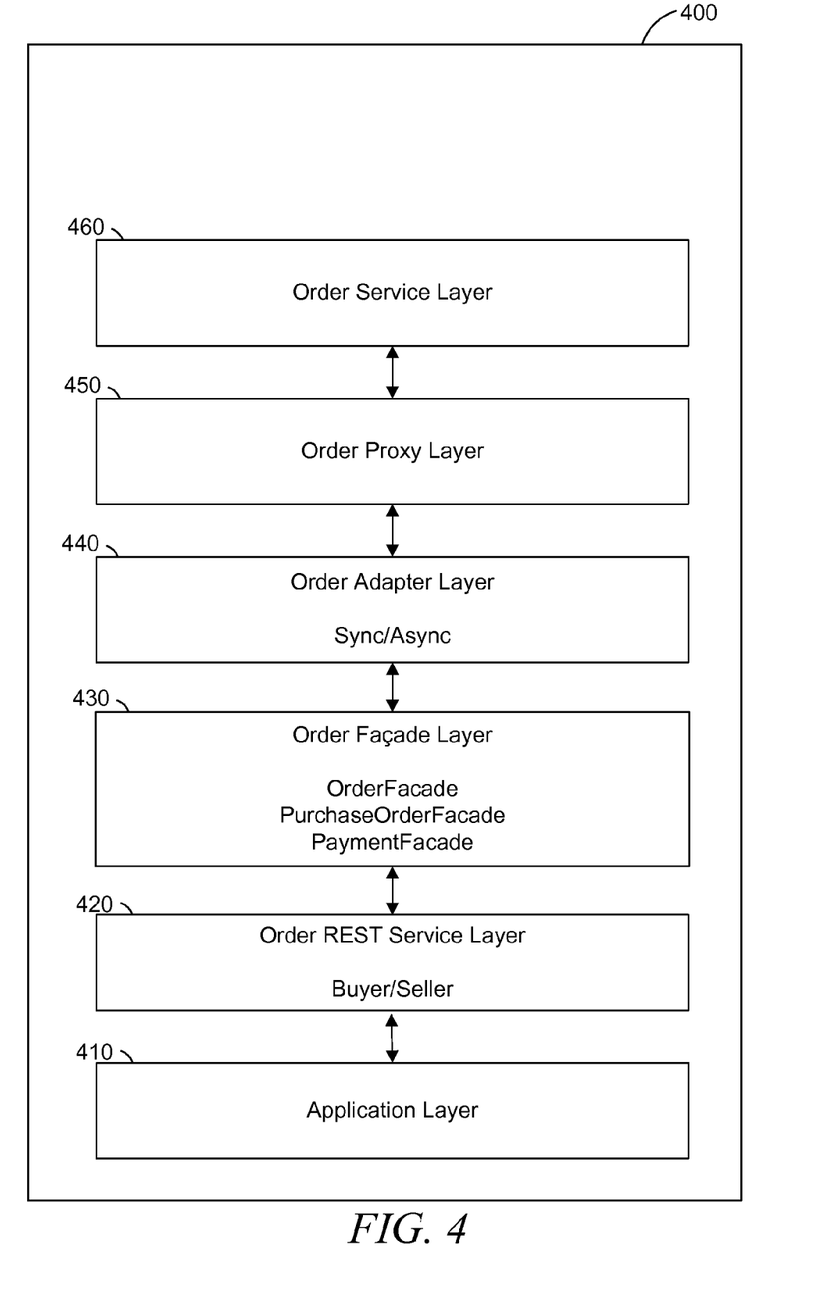
FIG. 4 is a block diagram illustrating a system for adapting legacy endpoints to modern APIs, according to example embodiments.

FIG. 4 is a block diagram illustrating a software stack 400 for adapting legacy endpoints to modern APIs, according to particular disclosed embodiments. Each element 420-460 of the software stack 400 may be implemented by the corresponding modules of FIGS. 2-3. For example, the order REST service layer 420 may be implemented by the service module 220 or 320. The input module 210 or 310 may receive function calls from the application layer 410. In example embodiments, the software stack 400 comprises an application layer 410, an order REST service layer 420, an order facade layer 430, an order adapter layer 440, an order proxy layer 450, and an order service layer 460.

The order service layer 460 may be implemented as a module in the service machine 110 or the legacy machine 120. For example, the order service layer 460 shown in FIG. 4 may be a legacy service oriented architecture (SOA) endpoint. The order service layer 460 may be configured to provide legacy service functions.

The order proxy layer 450 may include a service client that makes calls to the order service layer 460. The order proxy layer 450 may be implemented via remote-function calls (RFCs) on a stand-alone machine, integrated into the service machine 110, integrated into the legacy machine 120, or any suitable combination thereof. In such calls, the order service layer 460 may be considered the "server" in the client-server relationship with the service client of the order proxy layer 450. The service client may be available only for internal use by the order proxy layer 450. The order proxy layer 450 may also include a proxy module (e.g., the proxy module 250 or 350) that is accessible from outside of the order proxy layer 450. The proxy module 250 or 350 may expose methods from the legacy SOA service which are used farther up the chain (e.g., by the order adapter layer 440, the order facade layer 430, or the order REST service layer 420). The proxy module 250 or 350 may use the service client to make the calls to the order service layer 460.

The order adapter 430 may adapt the calls exposed by the order proxy 440. The order adapter 430 may focus on the functionality provided by the server. The system 400 may have different adapters for each type of proxy (e.g., orders, purchases, payments, etc.). The order adapter 430 may conform to both synchronous and asynchronous invocations of service APIs.

The order facade layer 430 may hide the adapter calls from the API consumers. In some example embodiments, the adapter calls are complicated and the facade calls are simpler. There may be a facade that corresponds to each adapter (e.g., an OrderFacade, a PurchaseOrderFacade, and a PaymentFacade corresponding to an Order Adapter, a PurchaseOrder Adapter, and a Payment Adapter, respectively).

The order REST service layer 420 may provide RESTful service calls to the consumer of the service, allowing the consumer to access the legacy SOA service (e.g., the order service layer 460) without using the SOA interface. In some example embodiments, the consumer does not need to understand how the SOA service operates. The consumer may be ignorant of the details of operations of layers above the order REST service layer 420 (e.g., the order facade layer 430, the order adapter layer 440, the order proxy layer 450, and the order service layer 460) and thus be protected from changes in those layers.

As an example, if the order proxy layer 450 changes the name of a function is exposing from the order service layer 460 only the order adapter layer 440 needs to be modified. More concretely, if the developer of the order proxy layer 450 changes the name of a method from "getAllPurchasesFromThisUser(User aUser)" to "getAllPurchasesByUser(User aUser)", the developer of the order adapter layer 440 modifies the order adapter layer 440 to make the new call, but all successive layers (e.g., order facade layer 430, order REST service layer 420, and end developers of the application layer 410 who will make RESTful API calls) may not need to know about the implementation details.

A user causing the execution of the software stack is an originator of the function calls. For example, a user of an application for the selling of items may interact with a user interface that causes the application, corresponding to the application layer 410, to generate a function call to the REST service layer 420. The user (in this case, the seller), would be the originator of the call to the REST service layer 420 as well as any calls generated by the REST service layer 420 in response to the function call.

Figure 5:
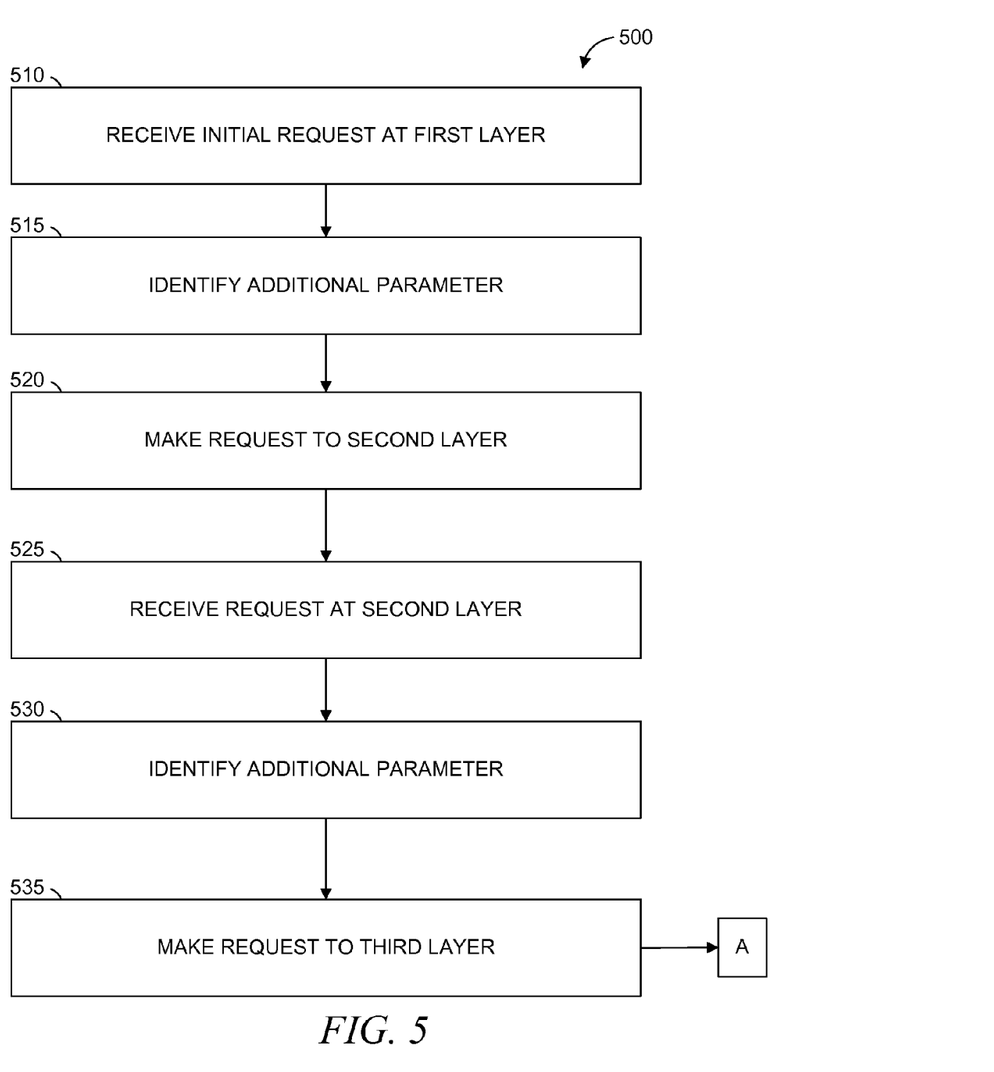
FIGS. 5-6 are flow diagrams illustrating operations of adapting legacy endpoints to modern APIs, according to example embodiments.
Figure 6:
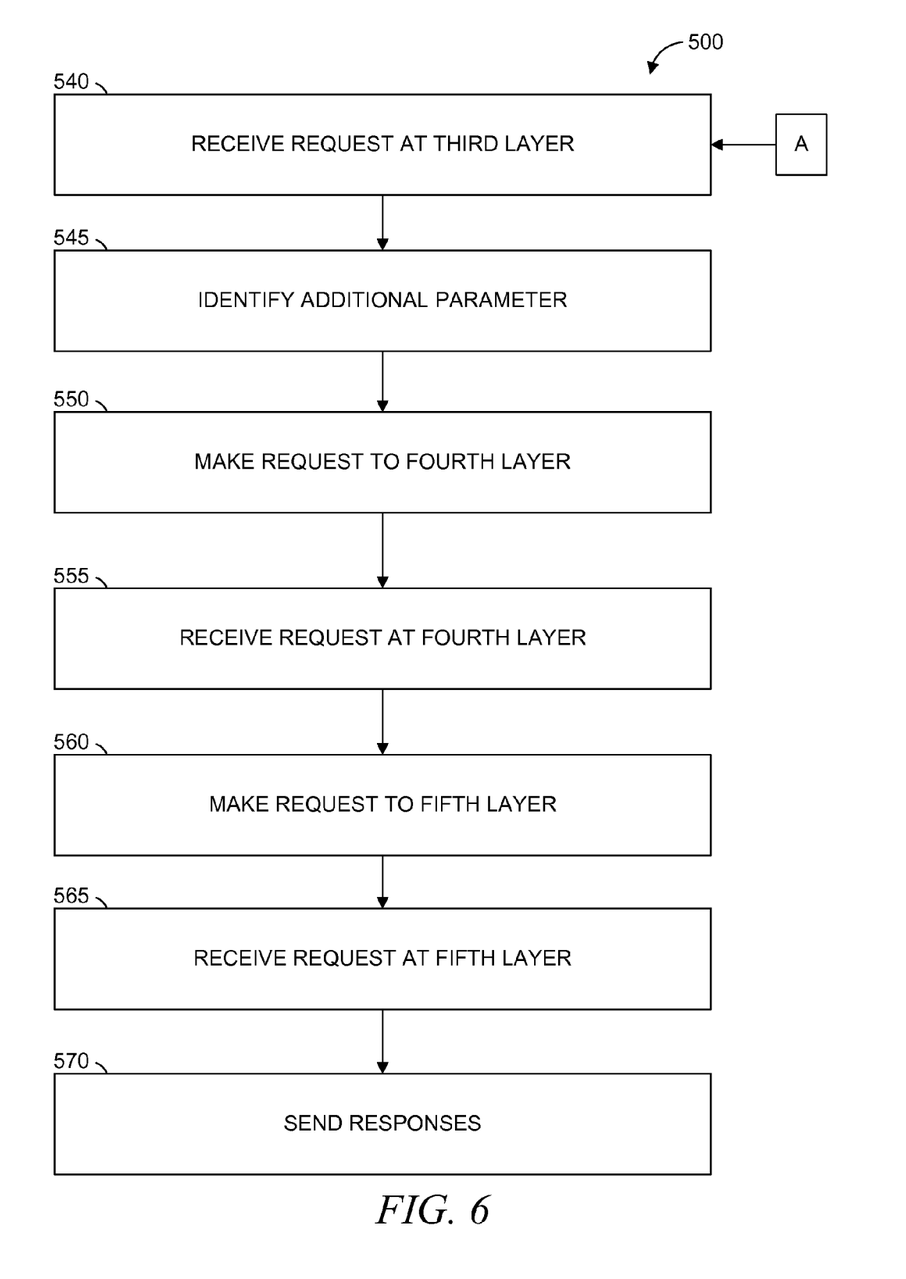

FIGS. 5-6 are flow diagrams illustrating operations of a machine in adapting legacy endpoints to modern APIs, according to particular example embodiments. While the various operations of the method 500 are described in reference to the service machine 110 of FIG. 2 and the legacy machine 120 of FIG. 3, other devices or systems may be employed to perform the method 500 in other embodiments.

In the operation 510, a machine performing the method 500 may receive a function call using a modern API at a first layer implemented by the input module 210 or 310. For example, the first layer may be the order REST services layer 420. To illustrate, the request may include an itemID and a transactionID as parameters and seek information about a transaction. The itemID may identify an item for sale in an online marketplace. The transactionID may identify a transaction on the online marketplace (e.g., a transaction of the item identified by the itemID).

In the operation 515, the first layer may identify an additional parameter used by a second layer (e.g., the order facade layer 430). For example, the second layer may want to know whether the request is from the point of view of a buyer or a seller. Based on the additional data desired by the second layer, the first layer may determine that the request is from a seller, and add an additional parameter indicating the origin of the request (e.g., the buyer or seller). The additional parameter may be obtained from a data object associated with the originator of the request (e.g., a buyer, a seller, a user of a web application making the request, or any suitable combination thereof).

In the operation 520, the first layer may be pass on the function call to the second layer. For example, a function in the second layer may be called and passed one or more parameters from the function call received in the operation 510 as well as one or more additional parameters identified in the operation 515.

In the operation 525, the second layer may receive the function call from the first layer, identify an additional parameter used by a third layer to process the function call (operation 530), and make the function call to the third layer (operation 535). The second layer may be implemented by the order facade layer 430 or by the facade module 230 or 330. The third layer may be implemented by the order adapter layer 440 or by the adapter module 240 or 340.

In the operation 540, the third layer may receive the function call from the second layer, identify an additional parameter used by a fourth layer to process the function call (operation 545), and make the function call to the fourth layer (operation 550). The fourth layer may be implemented by the order proxy layer 450 or by the proxy module 250 or 350. The fourth layer may be a proxy for the fifth layer, and thus perform a transformation on the function call without providing any additional parameters.

In the operation 555, the fourth layer may receive the function call from the third layer and make the function call to the fifth layer (operation 560). The fifth layer may be implemented by the order service layer 460 or the legacy module 260 or 360.

In the operation 565, the fifth layer may receive the function call from the fourth layer (operation 565) and respond to the request from the fourth layer (operation 570). Each layer in the stack (e.g., the fourth layer, the third layer, the second layer, and the first layer) may transform the response before sending it farther up the stack (operation 570). After each intermediate layer responds with the data, the initial request at the first layer may be responded to.

According to various example embodiments, one or more of the methodologies described herein may facilitate adapting legacy endpoints to modern APIs. The adaptation of legacy endpoints to modern APIs may improve the productivity of application developers by encapsulating the complexity of the legacy endpoint at various levels, thereby allowing the developer to focus on the problem at hand rather than on learning the complexities of the legacy API. This enhanced developer experience may provide the service provider with a competitive advantage. For example, a simplified API may allow a service provider to more rapidly develop new features. Likewise, encapsulating the complexity at various levels may allow the service provider to release new features without requiring extensive testing of features intended to be unchanged. In contrast, a monolithic service consumer that interacts with a legacy endpoint would most likely require many changes sprinkled throughout the code base. This may be a time consuming, frustrating, and error prone task for software developers. According to various example embodiments, one or more of the methodologies described herein may minimize the amount of work that needs to be done should things change by encapsulating logic in specific, focused layers such that if something in the service module (or any other module in the design) changes, the code changes needed to remain functional are reduced.

Figure 7:
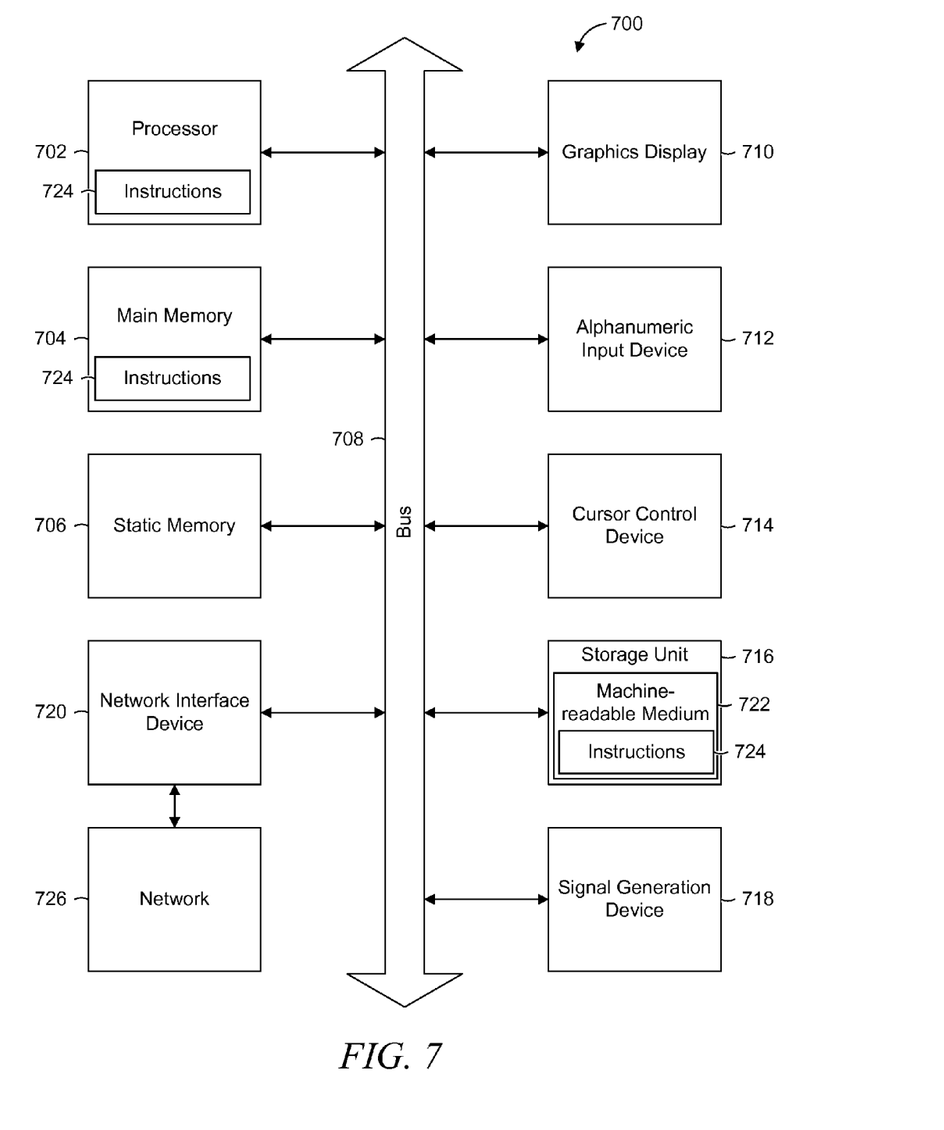
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed, in whole or in part. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 may include a machine-readable medium 722 on which are stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 (e.g., network 190) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A system comprising:
a memory having instructions embodied thereon;
one or more processors configured by the instructions to implement modules comprising:
  a proxy module configured to:
    expose service methods provided by a legacy module;
  an adapter module configured to:
    receive calls from a facade module;
    call methods in the proxy module; and
    provide desired results to the facade module;
  the facade module configured to:
    receive desired results from the adapter module;
    modify the desired results to conform to a format desired by a REST service module;
  the REST service module configured to:
    provide an application protocol interface;
    receive calls conforming with the application protocol interface;
    determine the correct methods in the facade module to call based on the calls;
    call the correct methods in the facade module; and
    respond to the calls with a result from correct methods in the facade module.

2. The system of claim 1, wherein the one or more processors are further configured to implement the legacy module configured to provide the service methods.

3. The system of claim 2, wherein the adapter module is further configured to determine one or more correct methods in the proxy module to call to provide the desired results; and wherein the calling of methods in the proxy module includes calling the one or more correct methods in the proxy module.

4. The system of claim 3, wherein the proxy module is configured to hide methods provided by the legacy module other than the service methods.

5. The system of claim 3, wherein the calls conforming with the application protocol interface are HTTP calls.

6. A non-transitory machine-readable medium having instructions embodied thereon which, when executed by one or more processors of a machine, cause the machine to implement modules comprising:
a facade module;
a REST service module;
a proxy module configured to perform operations comprising:
  expose service methods provided by a legacy module; and
an adapter module configured to perform operations comprising:
  receive calls from the facade module;
  call methods in the proxy module; and
  provide desired results to the facade module; wherein the facade module is configured to perform operations comprising:
  receive desired results from the adapter module;
  modify the desired results to conform to a format desired by the REST service module; and
the REST service module is configured to perform operations comprising:
  provide an application protocol interface;
  receive calls conforming with the application protocol interface;
  determine the correct methods in the facade module to call based on the calls;
  call the correct methods in the facade module; and
  respond to the calls with a result from correct methods in the facade module.

7. The non-transitory machine-readable medium of claim 6, wherein the machine is further configured to implement the legacy module.

8. The non-transitory machine-readable medium of claim 7, wherein the adapter module is further configured to determine one or more correct methods in the proxy module to call to provide the desired results; and wherein the calling of methods in the proxy module includes calling the one or more correct methods in the proxy module.

9. The system of claim 8, wherein the proxy module is configured to hide methods provided by the legacy module other than the service methods.

10. The system of claim 8, wherein the calls conforming with the application protocol interface are HTTP calls.

11. A method comprising:
  implementing, by one or more processors of a machine, software modules comprising:
    a facade module;
    a REST service module;
    a proxy module configured to perform operations comprising:
      expose service methods provided by a legacy module; and
    an adapter module configured to perform operations comprising:
      receive calls from the facade module;
      call methods in the proxy module; and
      provide desired results to the facade module; wherein
    the facade module is configured to perform operations comprising:
      receive desired results from the adapter module;
      modify the desired results to conform to a format desired by the REST service module; and
    the REST service module is configured to perform operations comprising:
      provide an application protocol interface;
      receive calls conforming with the application protocol interface;
      determine the correct methods in the facade module to call based on the calls;
      call the correct methods in the facade module; and
      respond to the calls with a result from correct methods in the facade module.

12. The method of claim 11, wherein the modules further comprise the legacy module.

13. The method of claim 12, wherein the adapter module is further configured to determine one or more correct methods in the proxy module to call to provide the desired results; and wherein the calling of methods in the proxy module includes calling the one or more correct methods in the proxy module.

14. The method of claim 13, wherein the proxy module is configured to hide methods provided by the legacy module other than the service methods.

15. The method of claim 13, wherein the calls conforming with the application protocol interface are HTTP calls.

* * * * *